(No Model.)
G. WILEY.
STEAMER.
No. 493,849. Patented Mar. 21, 1893.
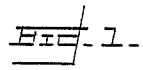
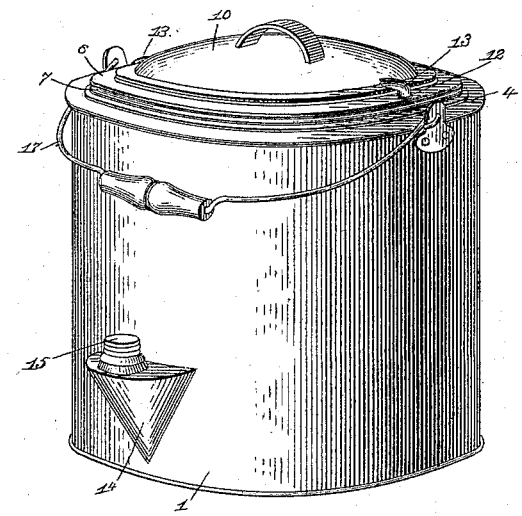
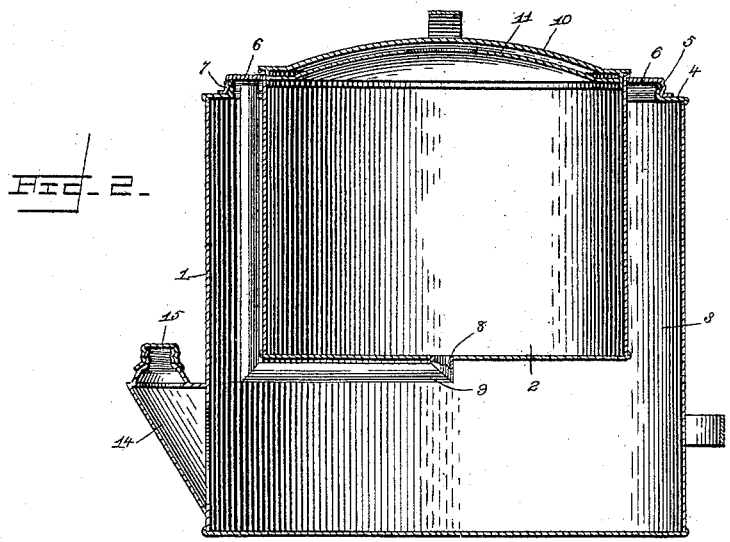
Witnesses
Inventor
George Wiley
By his Attorneys,

UNITED STATES PATENT OFFICE.

GEORGE WILEY, OF CHICAGO, ILLINOIS, ASSIGNOR OF TWO-THIRDS TO FRANCIS GRAHAM, OF SAME PLACE, AND ROBERT L. MOORHEAD, OF NEW YORK, N. Y.

STEAMER.

SPECIFICATION forming part of Letters Patent No. 493,849, dated March 21, 1893.

Application filed April 26, 1892. Serial No. 430,727. (No model.)

*To all whom it may concern:*

Be it known that I, GEORGE WILEY, a citizen of the United States, residing at Chicago, in the county of Cook and State of Illinois, have invented a new and useful Steamer, of which the following is a specification.

The invention relates to improvements in steamers.

The object of the present invention is to simplify and improve the construction of steamers, and to enable food to be rapidly cooked, cooked by steam, or to be heated without having the steam come in contact with it.

A further object of the invention is to enable food to be thoroughly steamed without liability of becoming soggy.

The invention consists in the construction and novel combination and arrangement of parts hereinafter fully described, illustrated in the accompanying drawings and pointed out in the claims hereto appended.

In the drawings—Figure 1 is a perspective view of a steamer constructed in accordance with this invention. Fig. 2 is a vertical sectional view. Fig. 3 is a detail sectional view showing one of the vents.

Like numerals of reference indicate corresponding parts in all the figures of the drawings.

1 designates an outer cylindrical vessel adapted to contain water to be heated, and converted into steam, and having detachably secured to it and arranged within it, an inner food containing vessel 2, which forms with the outer vessel an annular water chamber 3. The outer vessel 1 is provided at its upper edge with an inwardly extending annular flange 4 having a vertical upwardly projecting threaded portion 5; the upper edge of the inner vessel is provided with an outwardly extending annular flange 6 having a vertical depending portion 7, and the two threaded portions screw together and detachably secure the inner vessel within the outer one. The inner vessel is provided in its bottom with a central opening 8 which communicates with the lower end of an L-shaped tube 9, which extends along the bottom and one side of the inner vessel, and is arranged on the outside of the same. The upper end of the tube 9 is open and is arranged beneath the annular flange 6 of the inner vessel. The steam arising from the water in the annular chamber between the inner and outer vessels ascends and as the pressure increases it is forced down the vertical portion of the L-shaped tube, and thence into the inner vessel, thereby permeating and cooking the contents. The heated water and steam surrounds a lower portion of the inner vessel and thereby enables food to be cooked without requiring stirring and other attentions, as there is no liability of the food being burned up or becoming dried. The steam is not allowed to condense within the inner vessel, and the cover 10 which will be the coolest portion is provided with a partially opened lining 11 and if any steam condenses on the cover it will be within the lining and any moisture will be retained there. The flange 6 of the inner vessel is provided with oppositely disposed vent openings 12, which when the cover is in place are closed by plugs 13. The vent openings are preferably diametrically opposite each other, and the plugs are similarly disposed on the cover and are arranged slightly beyond the same, and the said plugs also serve as convenient means for unscrewing the inner vessel as this can be done by simply turning the cover, the plugs engaging the vent openings and causing the inner vessel to turn with the cover. The vent openings are provided to prevent, when any cold substance is placed within the inner vessel, condensation and back pressure within the tube and the annular chamber, and it will be seen that the vents are necessarily opened when the cover is removed to place anything within the steamer. The outer vessel is provided with a feed spout 14 by which water may be supplied to the outer vessel, and the feed spout is closed when not in use by a screw cap 15. Short tubes 16 are arranged at the vent openings and depend from the flange 6 and receive the plugs. The steamer is provided with a bail 17 which is hinged to suitable ears on the outer vessel.

What I claim is—

1. A steamer comprising an outer vessel having at its top a threaded portion, an inner vessel provided at its top with vent openings and having a threaded portion to screw on the threaded portion of the outer vessel, an L-shaped tube arranged on the outside of the inner vessel and having its lower end communicating with same through the bottom thereof, and a cover provided with plugs to fit in the vent openings and having on its inner face a lining separated from it by a space and provided with an opening, substantially as described.

2. A steamer comprising an outer vessel having at its top a threaded portion, an inner vessel provided at its top with vent openings and having a threaded portion to screw on the threaded portion of the outer vessel, and a cover provided with plugs adapted to fit into the vent openings and to close the same and to enable the cover to engage and unscrew the inner vessel, substantially as described.

In testimony that I claim the foregoing as my own I have hereto affixed my signature in the presence of two witnesses.

GEORGE WILEY.

Witnesses:
   O. F. CORR,
   M. I. REIS.